July 22, 1924.
J. W. PRICE, JR
PISTON ROD PACKING
Filed Oct. 25, 1919
1,502,524
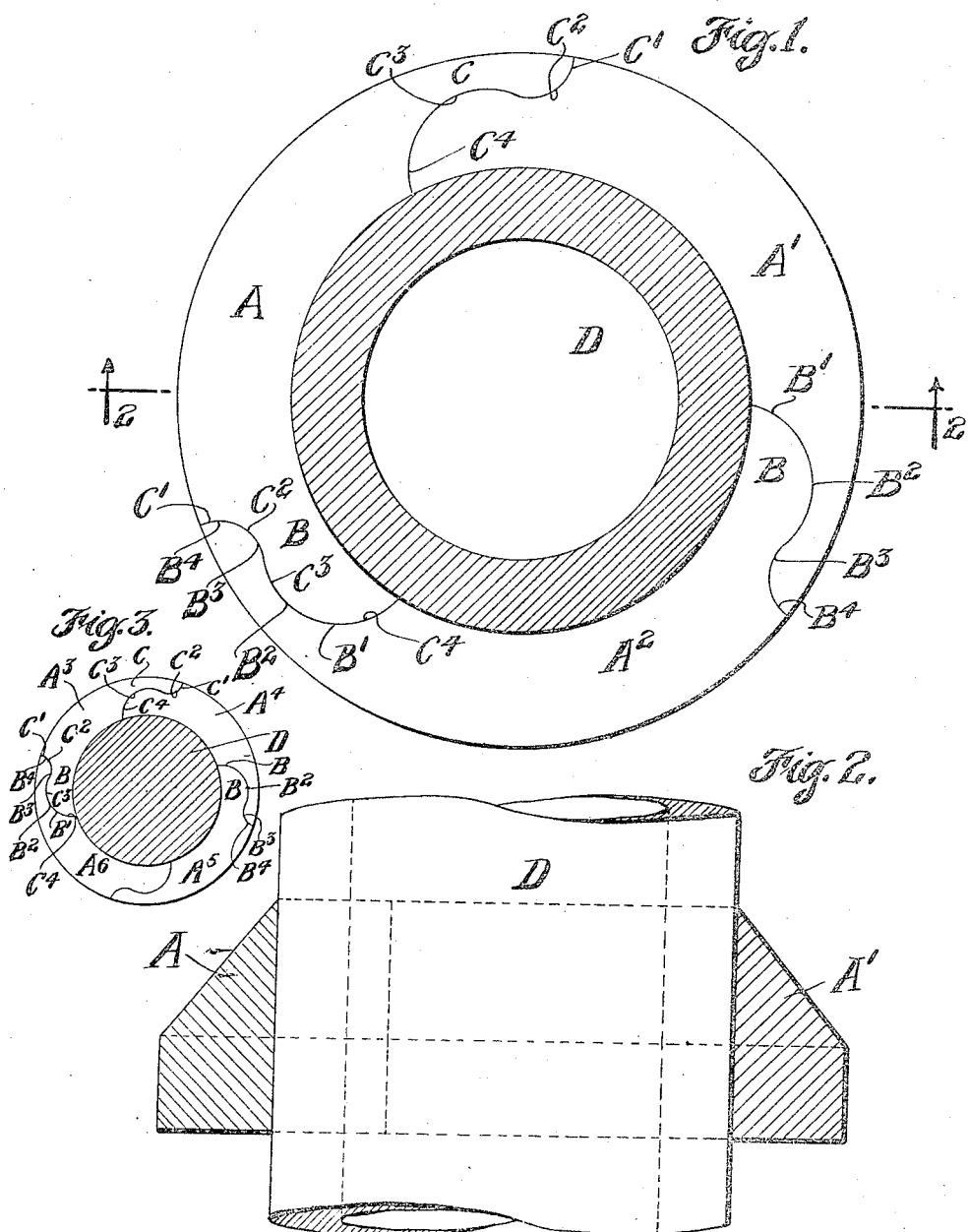
WITNESS:
Gustav Genzlinger.
INVENTOR
Joseph W. Price Jr
BY
ATTORNEY Patented July 22, 1924.

1,502,524

UNITED STATES PATENT OFFICE.

JOSEPH W. PRICE, JR., OF PHILADELPHIA, PENNSYLVANIA.

PISTON-ROD PACKING.

Application filed October 25, 1919. Serial No. 333,395.

*To all whom it may concern:*

Be it known that I, JOSEPH W. PRICE, Jr., a citizen of the United States of America, residing in the city and county of Philadelphia, in the State of Pennsylvania, have invented a certain new and useful Improvement in Piston-Rod Packings, of which the following is a true and exact description, reference being had to the accompanying drawings, which form a part thereof.

My invention relates to metallic piston rod packings and has for its object to provide a segmental packing ring the segments of which when assembled on a rod will be so engaged as to prevent, as far as possible, injurious angular movement of the segments with reference to each other, and, at the same time, so interengaged that any relative slip of the sections on each other which may occur in use will take place on oblique and preferably curved surfaces. A further and special object is to provide a three segment packing ring having the above noted qualities, and which can be readily assembled on a rod, and which, when so assembled, will have its segments locked against lateral displacement from each other and from the rod. With this object in view my invention consists in forming a packing ring of segments each of which is a duplicate of the others and has an outwardly facing, preferably bulb shaped, hook on one end and a complementary inwardly facing hook on its other end, and in its preferred form my invention consists in forming my packing ring of three similar segments united together by their overlapping hooked ends, and having such ends so formed that when assembled on a rod the segments will be locked against lateral displacement.

The nature of my invention will be best understood as explained in connection with the drawings in which Figure 1 is an end view of my three segment ring assembled on a piston rod.

Figure 2 is a section on line 2—2 of Fig. 1 with the rod shown in section, and

Figure 3 is an end view of a four segment ring also embodying my invention in its broader features.

A, A' and $A^2$ are the three sections or segments of which my ring is composed; they are similar to each other in size and shape and each is formed with a reduced end B, and a reduced end C, shaped to form an inwardly facing hook which is complementary to the outwardly facing hook so that abutted ends of two segments will fit and hook together, as shown. As shown, the end B curves outwardly from the inner edge of the ring segments as shown at B' to a point $B^2$, and then curves inwardly to a point $B^3$, and thence outwardly by a reversed curve as shown at $B^4$. The outer ends C of the segments curve inwardly from the outer edge, as shown at C', to a point $C^2$, thence outwardly to a point $C^3$, and thence inwardly by a reverse curve, as shown at $C^4$. The two hook ends thus formed being bulbular in form and complementary to each other, so that abutted ends of similar segments will fit together, and the shape of the hooked ends being such that when the three segments are assembled on a rod they will so interlock with each other and the rod that they cannot be laterally displaced.

D indicates the piston rod on which the ring segments are assembled.

In assembling, a segment, such as A', is placed on the upper part of the rod D, and another segment, such as A, hooked on to it so that its upper end also will lie against the upper part of the rod. The third section $A^2$ is then slid along the rod into engagement with segments A and A', and this can readily be done as the engaged segments A and A' will hold together and to the rod by gravity, and are readily held in place by one hand while the third segment is being slid into place. Once assembled the ring segments are interlocked against lateral displacement and can only be separated by sliding one segment along the rod while the others remain in place. It will be noted that the contacting faces of the segment ends are oblique and formed of a series of curves which are adapted to slide one upon the other in case of a contraction of the ring.

In case the ring is made up of more than three segments, for instance four, as shown in Fig. 3, the feature of interlocking against lateral displacement is lost, but the four segments shown at $A^4$, $A^5$, $A^6$ and $A^7$ are by reason of the interengagement of their hooked ends held against angular displacement from each other and they have the other advantages noted as to my preferred three segment ring, and are more easily assembled on a rod than would be a four segment ring the sections of which do not hook together.

It is advantageous that the inner hooked ends of the segments should be, as shown, thicker than the outer ends to allow for boring or wear.

My ring has not only the advantages above noted but is cheaply made owing to the fact that each segment is a duplicate of the others, and this fact also is an advantage in assembling the ring.

Having now described my invention, what I claim as new and desire to secure by Letters Patent, is:

A metallic packing ring made up of two or more similar segments, each having an outwardly facing bulb shaped hook at one end and an inwardly facing bulb shaped hook at its other end, both of said hook ends having tapered ends to facilitate slip on each other in taking up wear, the contact faces of said hooks being formed of merging reversed curves and said hooks being complementary to each other, so that said inner and outer hooks will interengage and fit together when assembled on a piston rod, and said hooked ends being so formed that the segments when assembled as a ring on a rod are locked against lateral displacement from each other and the rod and against angular displacement from each other.

JOS. W. PRICE, Jr.